(12) United States Patent
Stutrud et al.

(10) Patent No.: US 9,373,893 B2
(45) Date of Patent: Jun. 21, 2016

(54) METHOD FOR OPTIMIZING A YAGI-UDA ANTENNA FOR A RFID INLAY OR INTEGRATED CIRCUIT

(71) Applicants: Benn Stutrud, Libertyville, IL (US); John Poplawski, Hawthorn Woods, IL (US)

(72) Inventors: Benn Stutrud, Libertyville, IL (US); John Poplawski, Hawthorn Woods, IL (US)

(73) Assignee: WILLIAM FRICK & COMPANY, Libertyville, IL (US)

( * ) Notice: Subject to any disclaimer, the term of this patent is extended or adjusted under 35 U.S.C. 154(b) by 159 days.

(21) Appl. No.: 14/315,407

(22) Filed: Jun. 26, 2014

(65) Prior Publication Data
US 2015/0379313 A1 Dec. 31, 2015

(51) Int. Cl.
*H01Q 19/00* (2006.01)
*G06K 7/10* (2006.01)

(52) U.S. Cl.
CPC ............ *H01Q 19/00* (2013.01); *G06K 7/10009* (2013.01); *G06K 7/10346* (2013.01)

(58) Field of Classification Search
None
See application file for complete search history.

(56) References Cited

FOREIGN PATENT DOCUMENTS

WO     WO 2006020529 A1 *  2/2006  ......... G06K 19/0726

* cited by examiner

*Primary Examiner* — Daniell L Negron
(74) *Attorney, Agent, or Firm* — Justin Lampel (57) ABSTRACT

An RFID tag and a method for optimizing a Yagi-Uda antenna for a RFID inlay or integrated circuit is provided. The method has steps comprise: 1) selecting an electrically conductively first element; 2) generating an electrically conductive second element by taking a mirror image of the electrically conductive first element and trimming the second element; 3) generating a third element" along a line of axis of symmetry of the first two elements and on the opposite side of the first element as the electrically conductive second element; 4) adjusting the distance between the first three elements for optimum performance using $E_t(x)=EXP[a-x \cdot b]+E_\infty$; and 5) optionally, if the electrically conductive first element does not contain an IC (integrated circuit) or RFID inlay, then adding an IC or RFID inlay adjacent to/or physically touching the electrically conductive first element along the line of symmetry.

14 Claims, 8 Drawing Sheets

GEOMETRY OF A K ELEMENTS YAGI-UDA

$E_t(x) = EXP[a-x \cdot b] + E_\infty$
WHERE,
$E_t(x) =$ TAG'S THRESHOLD ENERGY AS A FUNCTION OF SEPARATION
$E_\infty =$ MINIMUM ATTAINABLE THRESHOLD ENERGY (EG MAX READ RANGE)
$x =$ DISTANCE BETWEEN ELEMENTS
$a =$ PLOT FITTING PARAMETER
$b =$ PLOT FITTING PARAMETER

METHOD FOR OPTIMIZING A YAGI-UDA ANTENNA FOR A RFID INLAY OR INTEGRATED CIRCUIT

CROSS REFERENCE TO RELATED APPLICATION

The following application is based on and claims the priority benefit of U.S. provisional application Ser. No. 61/839,503 filed Jun. 26, 2013 currently co-pending; the entire contents of which are incorporated by reference.

BACKGROUND OF THE INVENTION

An RFID tag and a method for optimizing a Yagi-Uda antenna for a RFID inlay or integrated circuit is provided. The method produces a tag having three or four non-touching separate, electrically conductive elements located within the same plane, wherein a space of no more than +/−0.10 inches is located from the top to the bottom of the inlay. The method has four main steps and an optional fifth step wherein the steps comprise: 1) first, selecting an electrically conductively first element (which in some cases may be an RFID dipole inlay with an integrated circuit or a conductive element dipole length which is adjusted to a dielectric constant of an applied substrate or form factor); 2) second, generating an electrically conductive second element by taking a mirror image of the electrically conductive first element, trimming off the length and/or width for the applicant's substrate; 3) third, generating a conductive strip (or "third element") approximately three-quarters the width of the electrically conductive first element and approximately one and a half times the length of the electrically conductive first element and centering the conductive strip along a line of axis of symmetry of the first two elements and on the opposite side of the first element as the electrically conductive second element; 4) fourth, adjusting the distance between the first three elements for optimum performance using $E_t(x)=EXP[a-x \cdot b]+E_\infty$; and 5) fifth, optionally, if the electrically conductive first element does not contain an IC (integrated circuit) or RFID inlay, then adding an IC or RFID inlay adjacent to/or physically touching the electrically conductive first element along the line of symmetry.

For an RFID tag with a dipole antenna, the orientation of the tag relative to the reader influences the maximum read distance of the tag. In fact, all RFID tags with a dipole antenna have a characteristic relationship between orientation and max read range called a radiation pattern. The shape of a dipole antenna's radiation pattern generally resembles the shape of an hourglass.

One way of making a dipole antenna's radiation pattern directional and increasing gain is by creating a Yagi-Uda antenna. A Yagi-Uda antenna is a directional antenna having a driven element (dipole or folded dipole) and additional parasitic elements (usually called reflector or directors). The reflector element is slightly longer than the driven dipole, whereas the directors are a little shorter. This design achieves a substantial increase in the antenna's directionality and gain compared to a simple dipole.

The parasitic elements in a Yagi antenna are mounted parallel to the driven element, with all the elements usually in a line perpendicular to the direction of radiation of the antenna. What effect a parasitic element has on the radiation pattern depends both on its separation from the next element, and on its length.

Attempts have been made to optimize RFID inlay devices. For example, U.S. Pat. No. 7,999,677 to Azuma discloses RFID tags each having an antenna partially raised from a surface of an underlying object by use of embossments in the RFID inlay base structure. Also disclosed are methods of forming the RFID tags and an RFID system utilizing the RFID tags.

Further, U.S. Pat. No. 8,248,240 to Osaki discloses an RFID tag having an inlay which has a base, an antenna formed on the base, and an IC chip. The IC chip is enclosed in a surface mount package and soldered to the antenna and carries out radio communication through the antenna. The RFID tag further includes underfill that fills a gap between the base and the surface mount package, and a sheath protecting material enclosing the entire inlay.

U.S. Pat. No. 8,212,676 to Cullen discloses a radio frequency identification (RFID) tag and method of manufacturing the same. In a preferred embodiment, the RFID tag includes a radio frequency (RF) inlay, the RF inlay including a carrier sheet, an antenna printed on the carrier sheet and a wireless communication device bonded to the antenna. The RFID tag also includes a plastic extrudate, the RF inlay being disposed within the extrudate so that the antenna and the wireless communication device are encapsulated on all sides within the extrudate. Optional metallic reflector and mounting adhesive layers may be laminated onto the underside of the extrudate. The present invention is also directed to an automated method for manufacturing the above RFID tag, such a method involving, in one embodiment, feeding a continuous supply of RF inlays into a cross-head extruder to yield a continuously extruded block and then cutting the block between successive antennae to yield a plurality of individual RFID tags.

However, these patents fail to disclose method for optimizing a Yagi-Uda antenna for an RFID inlay or IC which is efficient and easy to manufacture as is in the present method. Accordingly, a need exists for an improved method for optimizing a Yagi-Uda antenna for an RFID inlay or IC.

SUMMARY OF THE INVENTION

An RFID tag and a method for optimizing a Yagi-Uda antenna for a RFID inlay or integrated circuit is provided. The method produces a tag having three or four non-touching separate, electrically conductive elements located within the same plane, wherein a space of no more than +/−0.10 inches is located from the top to the bottom of the inlay. The method has four main steps and an option fifth step wherein the steps comprise: 1) First, selecting an electrically conductively first element (which in some cases may be an RFID dipole inlay with an integrated circuit or a conductive element dipole length which is adjusted to a dielectric constant of an applied substrate or form factor); 2) Second, generating an electrically conductive second element by taking a mirror image of the electrically conductive first element, trimming off the length and/or width for the applicant's substrate; 3) Third, generating a conductive strip (or "third element") approximately three-quarters the width of the electrically conductive first element and approximately one and a half times the length of the electrically conductive first element and centering the conductive strip along a line of axis of symmetry of the first two elements and on the opposite side of the first element as the electrically conductive second element; 4) Fourth, adjusting the distance between the first three elements for optimum performance using $E_t(x)=EXP[a-x \cdot b]+E_\infty$; and 5) Fifth, optionally, if the electrically conductive first element does not contain an IC (integrated circuit) or RFID inlay, then adding an IC or RFID inlay adjacent to/or physically touching the electrically conductive first element along the line of symmetry.

An advantage of the present method for optimizing a Yagi-Uda antenna for an RFID inlay or IC is that the present method allows for greater gain in signal.

A still further advantage of the present method for optimizing a Yagi-Uda antenna for an RFID inlay or IC is that the present method allows for a tag to be easily manufactured by roll to roll converting or manufacturing.

And another advantage of the present method for optimizing a Yagi-Uda antenna for an RFID inlay or IC is to provide an improved antenna which may be used when a narrow beam width is desirable.

And another advantage of the present method for optimizing a Yagi-Uda antenna for an RFID inlay or IC is to provide an improved antenna which confirms the direction of a product by an RFID scan.

And another advantage of the present method for optimizing a Yagi-Uda antenna for an RFID inlay is it provides the end user an ability to steer or aim the enhanced output in the direction of the placed collection antenna.

Another advantage of the present method for optimizing a Yagi-Uda antenna for an RFID inlay or IC is to provide an improved antenna which allows for separating reads from tags in high populations.

Yet another advantage of the present method of optimizing a Yagi-Uda antenna for an RFID inlay or IC is that the RFID inlay or IC may be, but is not required to be, physically secured or in contact with the first electrically conductive element.

For a more complete understanding of the above listed features and advantages of the improved method of optimizing a Yagi-Uda antenna for an RFID inlay or IC reference should be made to the following detailed description of the preferred embodiments and to the accompanying drawings.

DETAILED DESCRIPTION OF THE PREFERRED EMBODIMENTS

Figure 8:
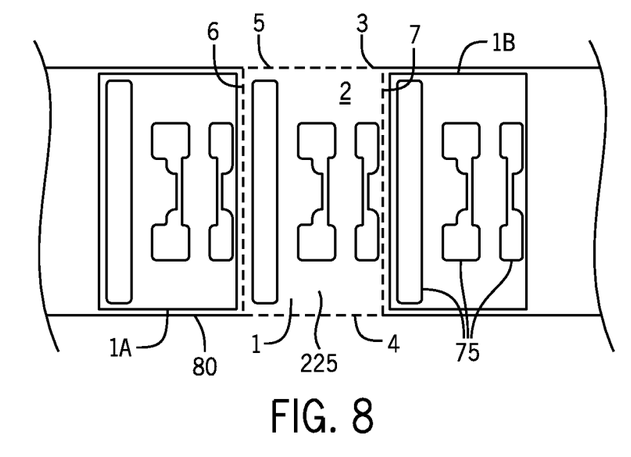
FIG. 8 illustrates a top view of an embodiment of the present optimized Yagi-Uda antenna RFID tag label as used in a series during a production run.
Figure 9:
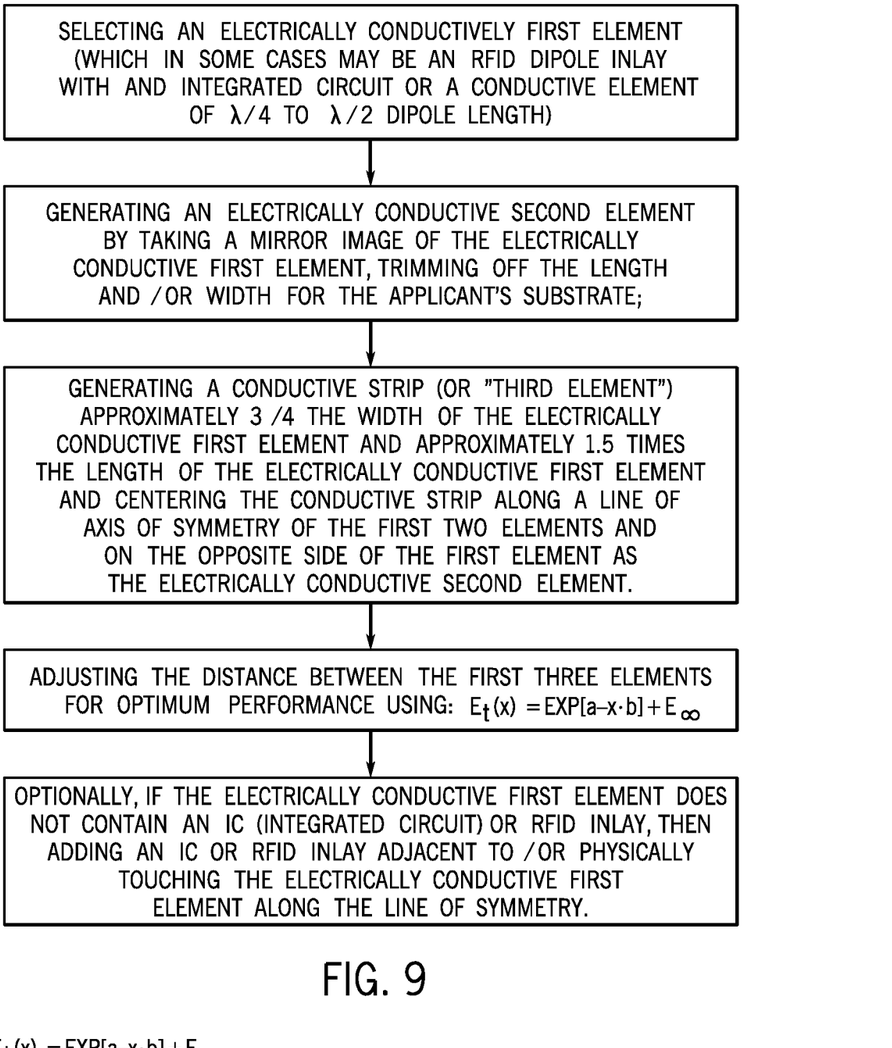
FIG. 9 illustrates the flow chart for generating the embodiment of the antenna in FIG. 3.
Figure 10:
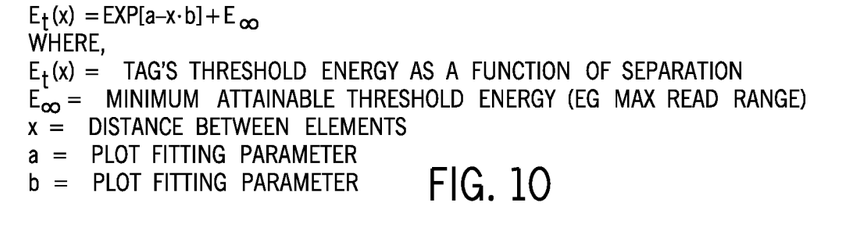
FIG. 10 illustrates the optimized performance factor equation for generating the antenna of FIG. 3.

An RFID tag and a method for optimizing a Yagi-Uda antenna for a RFID inlay or integrated circuit is provided. The method produces a tag having three or four non-touching separate, electrically conductive elements located within the same plane, wherein a space of no more than +/−0.10 inches is located from the top to the bottom of the inlay. The method has four main steps and an optional fifth step wherein the steps comprise: 1) first, selecting an electrically conductively first element (which in some cases may be an RFID dipole inlay with an integrated circuit or a conductive element dipole length which is adjusted to a dielectric constant of an applied substrate or form factor); 2) second, generating an electrically conductive second element by taking a mirror image of the electrically conductive first element, trimming off the length and/or width for the applicant's substrate; 3) third, generating a conductive strip (or "third element") approximately three-quarters the width of the electrically conductive first element and approximately one and a half times the length of the electrically conductive first element and centering the conductive strip along a line of axis of symmetry of the first two elements and on the opposite side of the first element as the electrically conductive second element; 4) fourth, adjusting the distance between the first three elements for optimum performance using $E_t(x)=EXP[a-x\cdot b]+E_\infty$; and 5) fifth, optionally, if the electrically conductive first element does not contain an IC (integrated circuit) or RFID inlay, then adding an IC or RFID inlay adjacent to/or physically touching the electrically conductive first element along the line of symmetry. Referring first to FIG. 8, a RFID tag 1 is provided. FIG. 8 illustrates the antenna without the IC attached. The RFID tag 1 is especially suitable for securing to and tracking an object (not shown). The present RFID tag 1 may have an optimized Yagi-Uda antenna portion 75 (FIG. 3) secured to a form factor 225. The RFID tag 1 may have a top 2, a bottom 3, a front 4, a back 5, a first side 6 and a second side 7. In an embodiment, the RFID tag 1 may be produced in a series such that the RFID tag 1 is surrounded by identical neighboring tags 1A (FIG. 8) and 1B on a strip 180 and wherein the bottom 3 of the RFID tags 1, 1A and 1B are temporarily secured to the strip 180 via an adhesive. Generally, the RFID tag 1 is preferably thin, measuring approximately no more than +/−0.10 inches from the top 2 to the bottom 3. The RFID tag 1 may have, for example, an electrically conductive first element 50 (FIG. 3), an electrically conductive second element 60, an electrically conductive third element 70 and an RFID inlay or IC 80.

Figures 1A, 1B, 2:
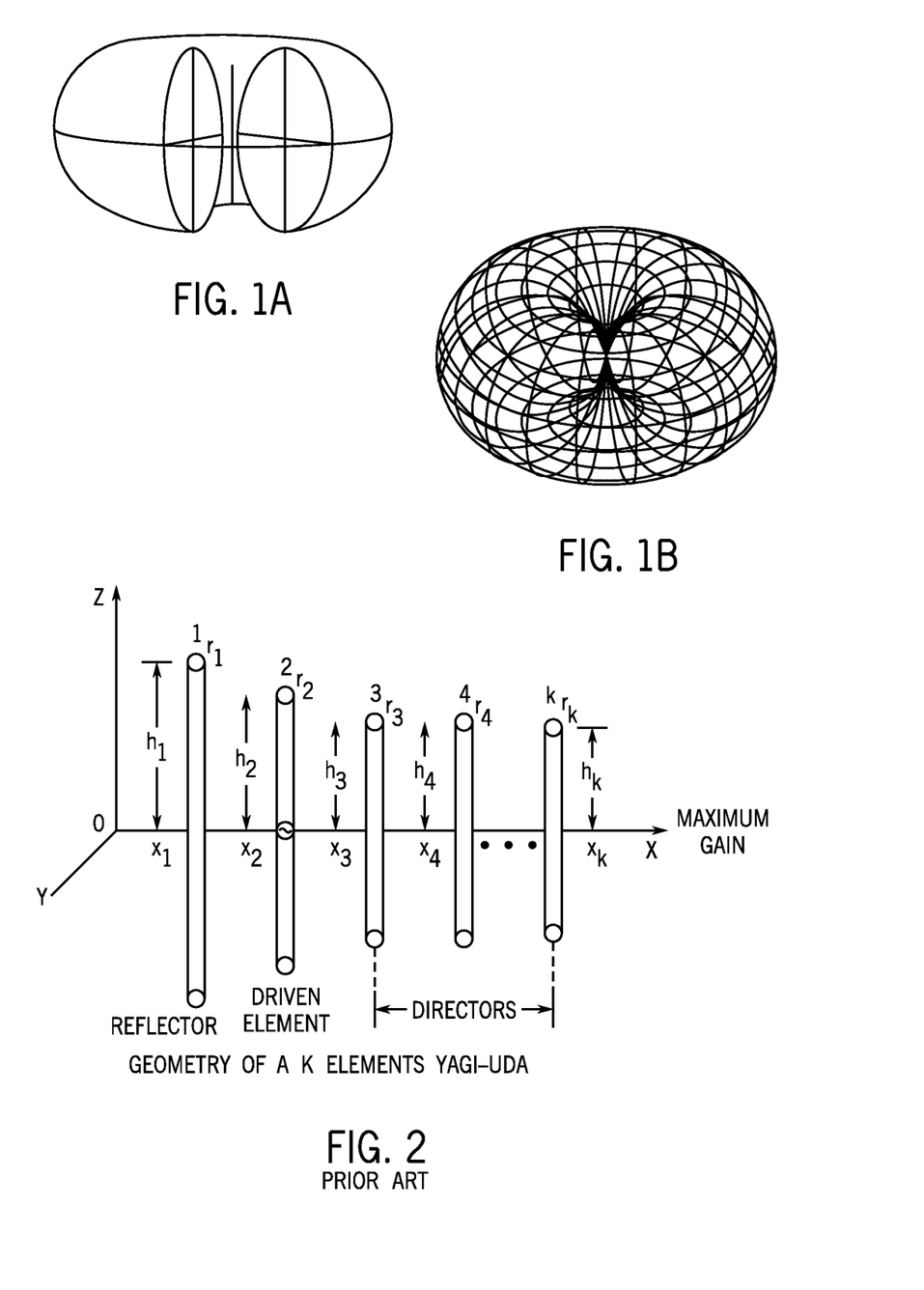
FIGS. 1a and 1b illustrate a dipole antenna 3D radiation pattern.
FIG. 2 illustrates a general schematic of a Yugi-Uda antenna (Prior Art).
Figure 3:
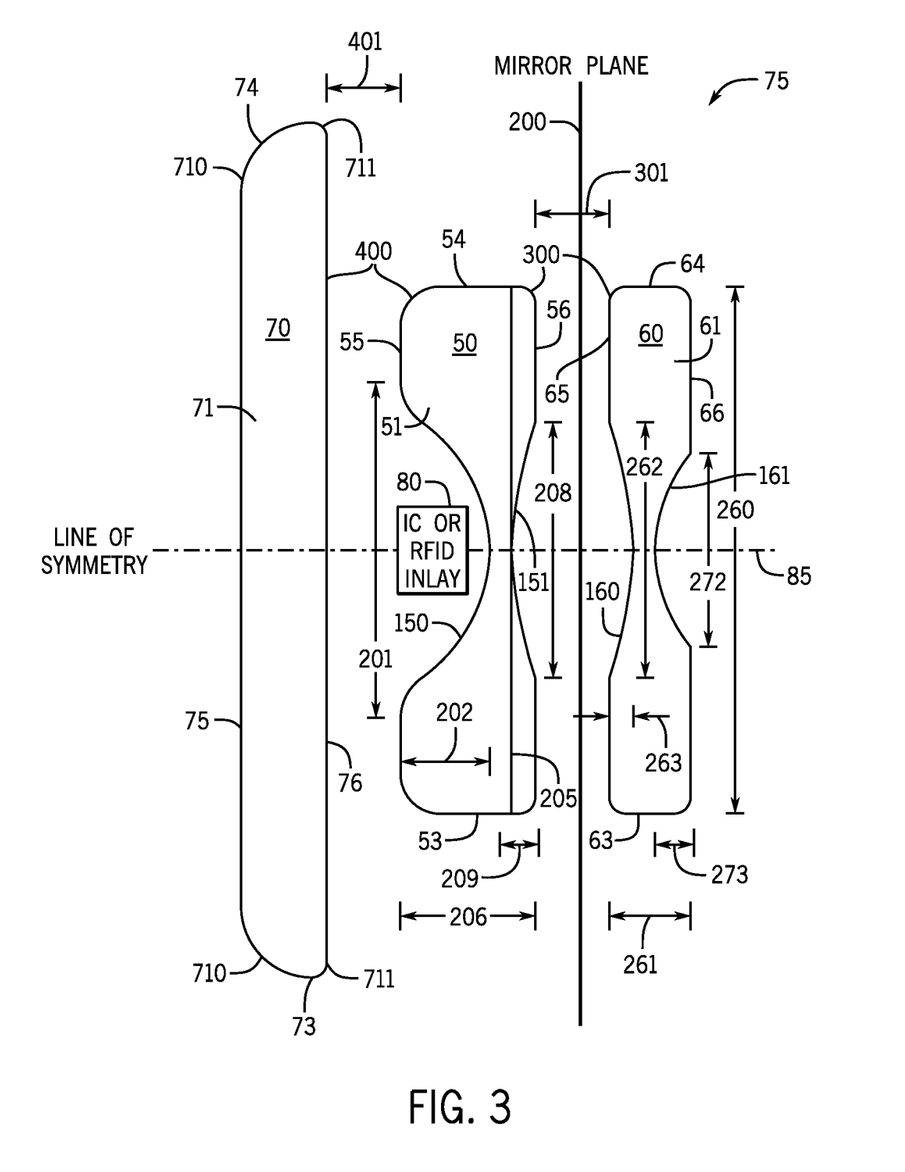
FIG. 3 illustrates an embodiment of an antenna generated using the present method.
Figure 4:
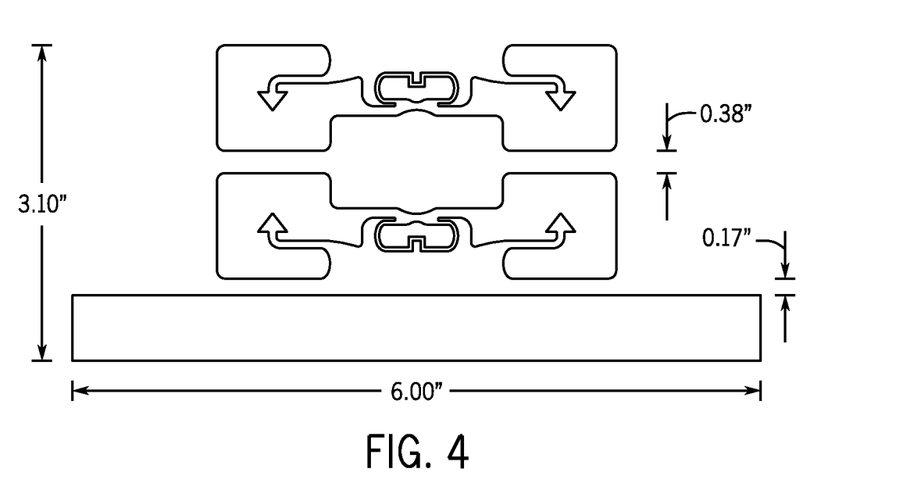
FIG. 4 illustrates a construction of an optimal Yagi Construction using a Smartrac Dogbone™ inlay.
Figure 5:
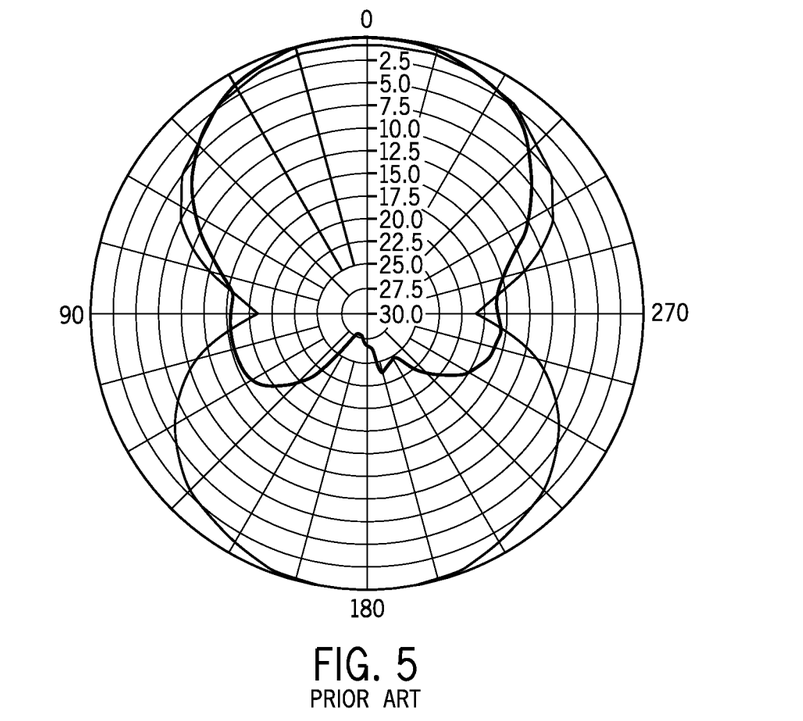
FIG. 5 illustrates a Normalized radiation pattern in units of negative dB (Prior Art) for a dipole RFID tag by itself, and optimized Yagi RFID tag.

The construction of tag 1 having an optimized Yagi-Uda antenna 75 consists of the following steps:
STEP 1:

Referring now to FIG. 3, a user first selects an electrically conductively first element 50. Preferably, the electrically conductive first element 50 is an antenna. The electrically conductive first element 50 is generally an electrically conductive thin strip made of, for example, an etched metal such as aluminum or copper. In an alternative embodiment, the first element 50 is not an etched metal, but is merely an electrically conductive printed ink Further, in an embodiment, the electrically conductive first element 50 may have an RFID dipole inlay portion 80 with an IC or conductive element of λ/4 to λ/2 dipole length already secured to the electrically conductive first element 50. If the generally conductive first element 50 is merely a thin strip (lacking the RFID dipole inlay portion 80 with an IC or conductive element), then the RFID inlay or IC 80 may be later added to the existing antenna 75 (at the electrically conductive first element 50) as is illustrated in Step 5 below.

Figure 7A:
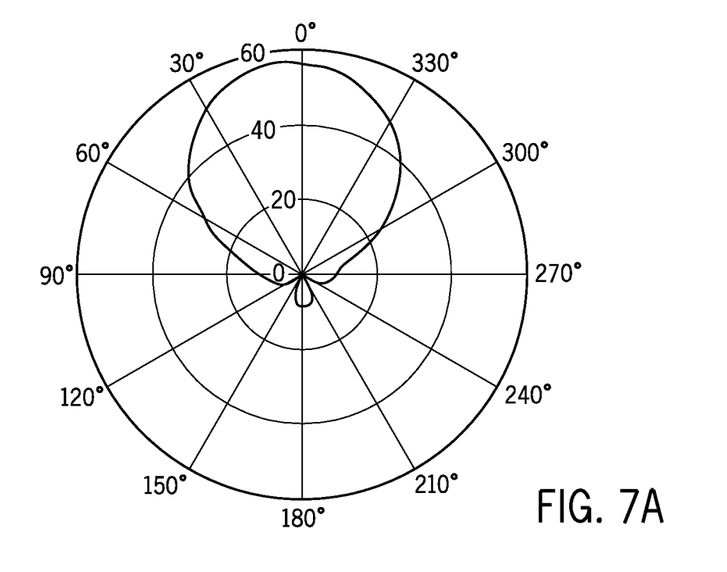
FIG. 7a illustrates the theoretical read range forward radiation pattern in feet for an inlay generated utilizing the present method.
Figure 7B:
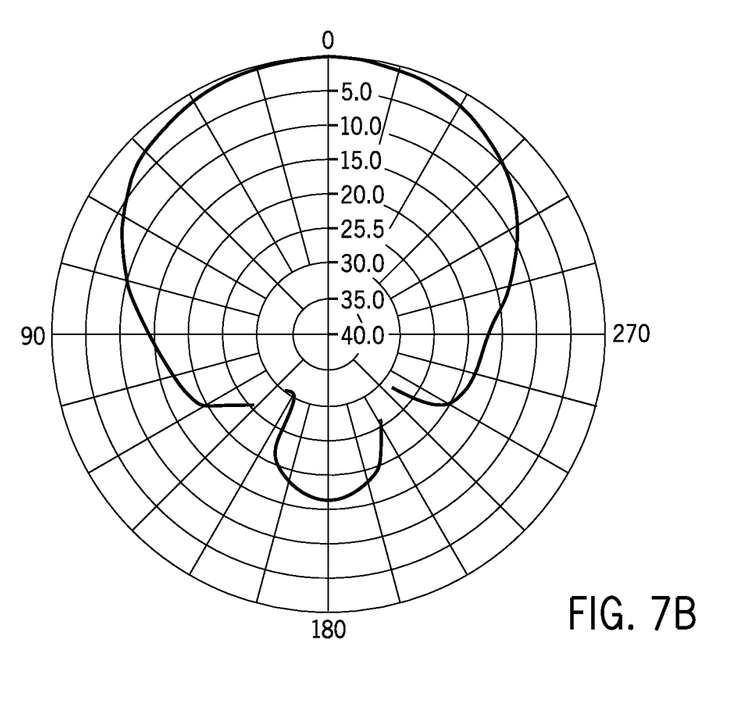
FIG. 7b illustrates the normalized radiation pattern in units of negative dB (Prior Art) for a dipole RFID Tag.

In an embodiment, the RFID dipole inlay portion 80 may be completely located within the indentation 150 of the first side 55 of the electrically conductive first element 50 while not physically touching any portion of the electrically conductive first element 50. Further, in an alternative embodiment, the RFID dipole inlay portion 80 may be completely located within the indentation 150 of the first side 55 of the electrically conductive first element 50 but in this embodiment the RFID dipole inlay portion 80 may at least partially touch a portion of the electrically conductive first element 50. The location of the RFID dipole inlay portion 80 either touching or not touching the electrically conductive first element 50 may be determined based on easily testing the two versions to determine which has a better read range for the altered device 1 and then producing the RFID tag in that orientation. In an embodiment of the method, the method includes testing the exact location of the inlay 80 within the indentation 150 of the electrically conductive first element 50 only after the location and shape of the first electrically conductive element 50, the second electrically conductive element 60 and the third electrically conductive element 70 have been determined. Determining the location of the inlay 80 last with respect to the conductive elements 50, 60, 70 results in the RFID tag 1 of the present device 1 providing an optimal read range (as illustrated in the graph of FIG. 7a).

Figure 6:
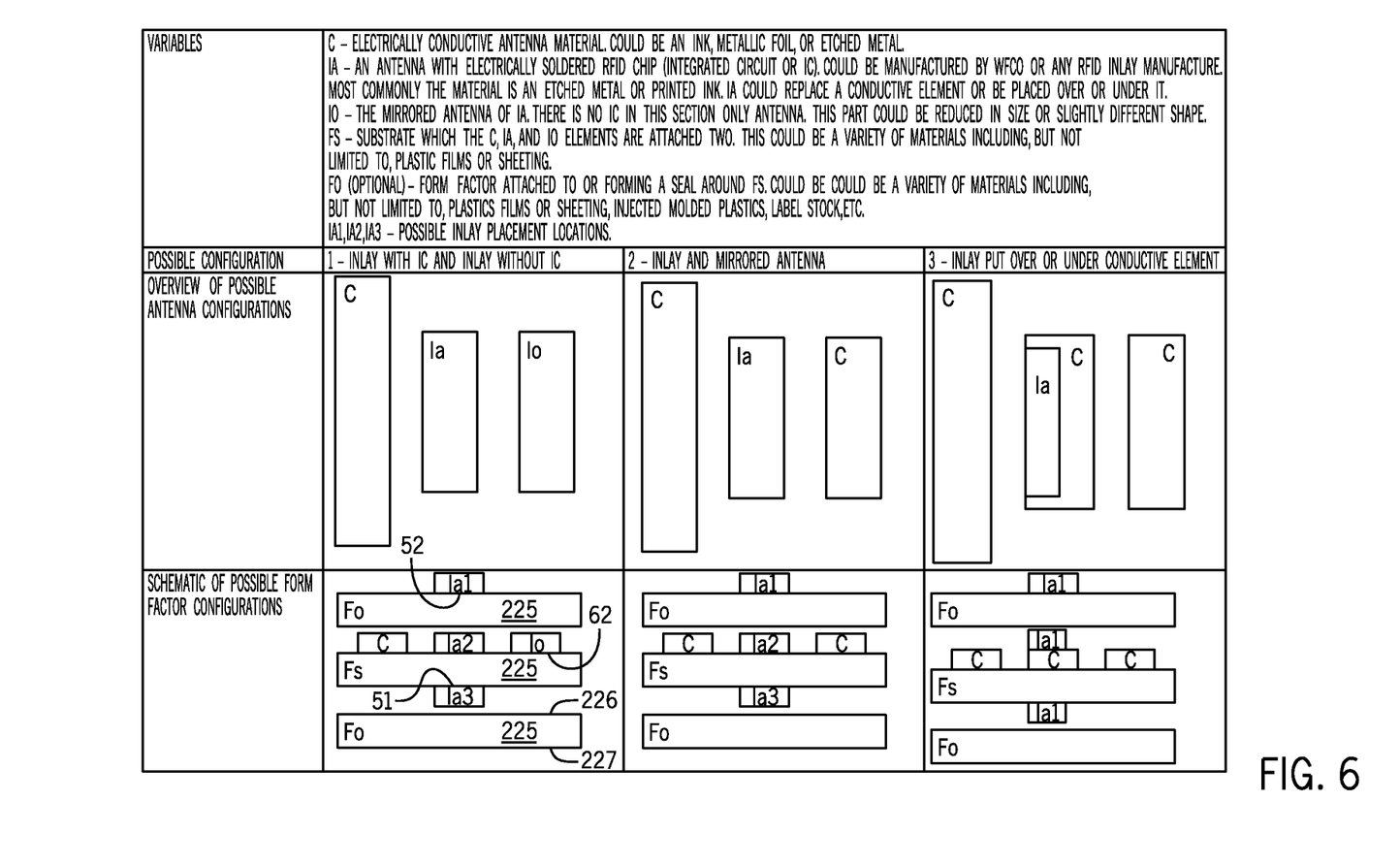
FIG. 6 illustrates a table showing the various embodiments of the present method.

The generally conductive first element 50 may have a top 51, a bottom 52 (FIG. 6), a front 53, a back 54, a first side 55 and a second side 56. In an embodiment, the first side 55 of the electrically conductive first element 50 may have a generally curved indentation 150 which is greater in surface area than an indentation 151 located on the second side 56 of the electrically conductive first element 50. The indentation 150 of the first side 55 of the electrically conductive first element 50 may allow the device 1 to combine the properties of a slot antenna with that of a dipole antenna. More specifically, the indentation 150 may allow the device 1 to operate similar to a Vivaldi-antenna (a co-planar broadband-antenna, which is made from a dielectric plate metalized on both sides.) In an embodiment, the electrically conductive first element 50 may be initially carved from a rectangle. The two slots (or "indentations") may then be added and widened for an optimal form factor and performance as discussed below.

In an embodiment, the indentation 150 of the first side 55 of the generally first conductive element 50 may have a length 201 and a width 202. The indentation 150 of the first side 55 and the indentation 151 of the second side 56 of the generally first conductive element 50 may expose a form factor 225 (FIG. 8) on which the generally first conductive element 50 (and other conductive elements as discussed below) are secured.

In an embodiment, the length 201 of the indentation 150 at the first side 55 of the electrically conductive first element 50 may be approximately fifty-five to sixty-five percent of a total length 205 of the electrically first conductive element 50 (IE—the length 205 being the distance from the front 53 to back 54 of the electrically conductive first element 50). The width 202 of the indentation 150 of the first side 55 of the electrically conductive first element 50 may be approximately sixty to seventy percent of the overall width 206 of the electrically conductive first element 50.

In an embodiment, the indentation 150 of the first side 55 of the electrically conductive first element 50 may be, for example, arched-shaped forming a portion of a circle having a radius approximately equal to thirty-forty percent of the overall length 205 of the electrically conductive first element 50; ideally one-third the overall length 205. As a result of the size and shape of the indentation 150 of the first side 55 of the electrically conductive first element 50, the RFID tag 1 of the present device 1 provides an optimal read range (as illustrated in the graph of FIG. 7a).

In an embodiment, the indentation 151 of the second side 56 of the electrically conductive first element 50 may have a length 208 and a width 209. The length 208 of the indentation 151 of the second side 56 of the electrically conductive first element 50 may be approximately seventy-five to eighty-five percent of the overall length 201 of the indentation 150 of the first side 55. The width 209 of the indentation 151 of the second side 56 may be approximately half the width 202 of the indentation 150 of the first side 55. The indentation 151 of the second side 55 of the electrically conductive first element 50 may be, for example, arched-shaped forming a portion of a circle having a radius of approximately one hundred and fifty to one hundred and eighty percent of the overall length 205 of the electrically conductive first element 50. As a result of the size and shape of the indentation 151 of the second side 56 of the electrically conductive first element 50, the RFID tag 1 of the present device provides an optimal read range (as illustrated in the graph of FIG. 7a).

Figure 11:
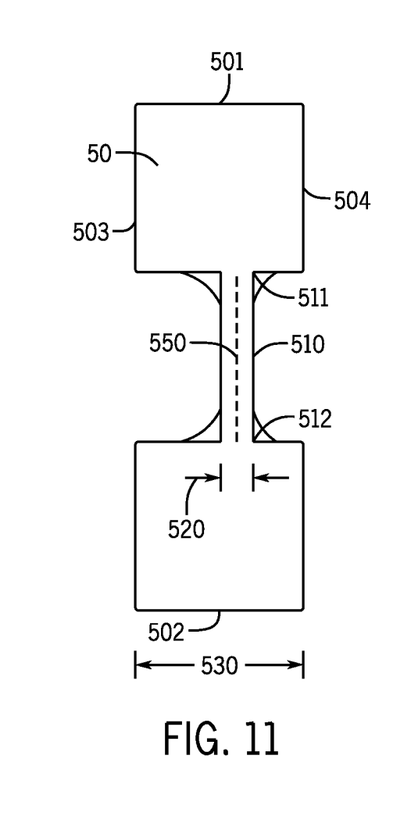
FIG. 11 illustrates an alternative embodiment of the electrically conductive first element wherein the electrically conductive first element has a square-shaped configuration.
Figure 12:
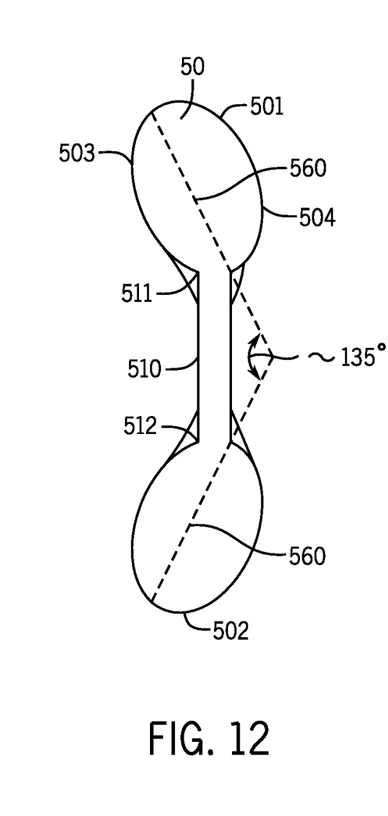
FIG. 12 illustrates an alternative embodiment of the electrically conductive first element wherein the electrically conductive first element has an oval-shaped configuration.
Figure 13:
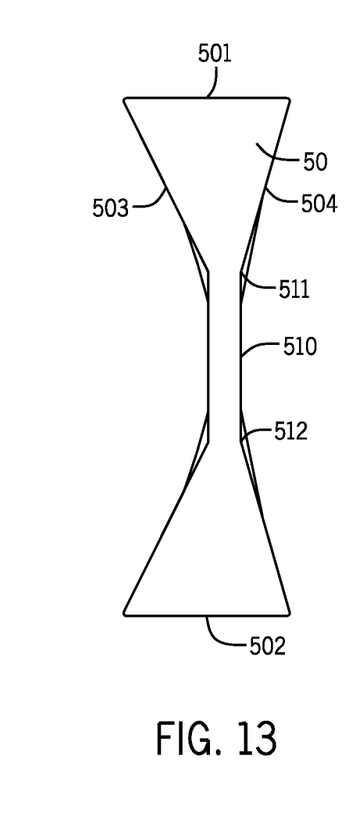
FIG. 13 illustrates an alternative embodiment of the electrically conductive first element wherein the electrically conductive first element has a triangular-shaped configuration.

Referring now to FIGS. 11-13, in an alternative embodiment, the electrically conductive first element 50 may have various other shapes (as opposed to the shape as illustrated in FIG. 3). In these embodiments, the electrically conductive first element 50 may have a top unit 501, a bottom unit 502, a first side 503 and a second side 504. In this embodiment, the top unit 501 and the bottom unit 502 may be symmetrical and mirror images of each other. The top unit 501 and the bottom unit 502 may be connected by a bridge portion 510 having a top 511 and a bottom 512 wherein the top 511 of the bridge portion 510 is connected to the top unit 501 and the bottom 512 of the bridge portion 510 is connected to the bottom unit 502. The bridge portion may have a width 520. Preferably, the width 520 of the bridge portion 510 is approximately one sixth of an overall width 530 of the electrically conductive first element 50. As a result of this one-sixth percentage, the RFID tag 1 of the present device provides an optimal read range (as illustrated in the graph of FIG. 7a).

In an embodiment, the bridge portion 510 may have an imaginary vertical center line of symmetry 550 (which divides the bridge portion 510). The bridge portion 510 (and therefore the imaginary vertical center line of symmetry 550) may be offset; therein closer to the second side 504 of the electrically conductive first element 50 than to the first side 503 of the electrically conductive first element 50. More specifically, imaginary vertical center line of symmetry 550 of the bridge portion 510 may be located approximately sixty to sixty-five percent closer to the second side 504 than to the first side 503 (ideally 62.5%). As a result of being sixty to sixty-five percent closer to the second side 504 (and therein closer to the electrically conductive second element 60, the RFID tag 1 of the present device provides an optimal read range (as illustrated in the graph of FIG. 7a).

Referring now to FIGS. 12 and 13, in an embodiment, the top unit 501 and the bottom unit 502 may be angled with respect to the bridge portion 510. More specifically, the top unit 501 and the bottom unit 502 may have an imaginary axis line 560 which extend from the farthest most point of the top unit 501 and the farthest point on the bottom unit 502 to the opposing side of the bridge portion 510. When the imaginary axis line 560 is extended beyond the electrically conductive first unit 50, they would intersect at an angle of approximately one hundred and twenty-five to one hundred and fifty degrees. It may also be stated that the imaginary vertical center line of symmetry 550 of the bridge portion 510 intersect the imaginary axis line 560 of the top unit 501 and the bottom unit 502 at approximately one hundred and forty-five to one hundred and sixty-five degrees. As a result of these angles, the RFID tag 1 of the present device provides an optimal read range (as illustrated in the graph of FIG. 7a).

STEP 2:

Referring again to FIG. 3, after generating the electrically conductive first element 50 (which could resemble an alternative embodiment as illustrated in FIGS. 11-3), the user then generates an electrically conductive second element 60 by taking a mirror image of the electrically conductive first element 50 and then altering the same. The mirror image of the electrically conductive second element 60 may be reflected along an imaginary divider line 200. In an embodiment, the electrically conductive second element 60 is slightly smaller than the electrically conductive first element 50.

The electrically conductive second element 60 may have a top 61, a bottom 62 (FIG. 6), a front 63, a back 64, a first side 65 and a second side 66. The distance from the front 63 to the back 64 of the electrically conductive second element 60 may define a length 260. The distance from the first side 65 to the second side 65 of the electrically conductive second element 60 may define a width 261. In an embodiment, the width 261 of the electrically conductive second element 60 is trimmed (after the mirror image is taken) to approximately fifty-five to sixty-five percent (ideally sixty) the width 206 of the electrically conductive first element 50. As a result, the RFID tag 1 of the present device 1 provides an optimal read range (as illustrated in the graph of FIG. 7a.)

As stated above, the electrically conductive second element 60 may be trimmed after the mirror image of the electrically conductive first element 50 is taken. In particular, the length 260 and/or width 261 of the electrically conductive second element 60 may be trimmed for the applicant's substrate (such as plastic, wood, glass, etc.). In an embodiment, the electrically conductive second element 60 may be a director. As a result of this design, there may be a beneficial decreasing in the radiation pattern behind the RFID inlay or IC 80.

In an embodiment, the first side 65 of the electrically conductive second element 60 may have an indentation 160 which is substantially similar to an indentation 161 which may be located on the second side 66 of the electrically conductive second element 60 in terms of overall surface area. The indentations 160, 161 of the electrically conductive second element 60 may operate in the same fashion as stated above with respect to Step 1.

In an embodiment, the indentation 160 of the first side 65 of the electrically conductive second element 60 may have a length 262 and a width 263. Generally, the length 262 and the width 263 of the indentation 160 of the first side 65 of the electrically conductive second element 60 may be substantially similar to or identical to the indentation 151 of the second side 56 of the electrically conductive first element 50. In particular, the indentation 160 of the first side 65 of the electrically conductive second element 60 is substantially similar to (or identical to) the indentation 151 of the second side 56 of the electrically conductive first element 50 in size, shape and surface area. As a result, the RFID tag 1 of the present device 1 provides an optimal read range (as illustrated in the graph of FIG. 7a.)

While the indentation 160 of the first side 65 of the electrically conductive second element 60 is substantially similar or identical to the indentation 151 of the second side 56 of the electrically conductive first element 50, the indentation 161 of the second side 66 of the electrically conductive second element 60 is not substantially similar to nor identical in size, shape or surface area as the indentation 150 of the first side 55 of the electrically conductive first element 50. In particular, the indentation 161 of the second side 66 of the electrically conductive second element 60 may have a length 272 and a width 273 wherein the length 272 of the indentation 161 is approximately thirty-five to forty-five percent of the overall length 260 of the electrically conductive second element 60 and wherein the width 273 of the indentation 161 is approximately forty-five to fifty-five percent of the overall width 261 (or "front") of the electrically conductive second element 60. The indentation 161 of the second side 66 of the electrically conductive second element 60 may be arched-shaped forming a portion of a circle wherein the radius of the circle is approximately twice the length as the overall width 261 of the electrically conductive second element 60. As a result, the RFID tag 1 of the present device 1 provides an optimal read range (as illustrated in the graph of FIG. 7a).

The electrically conductive second element 60 is then placed on the same plane as the electrically conductive first element 50. More specifically, the first side 65 of the electrically conductive second element 60 may be placed near, for example, the second side 56 of the electrically conductive first element 50, but not touching the electrically conductive first element 50. Instead, a space 300 (wherein the mirror plane exists) may be located between the second side 56 of the generally conductive first element 50 and the first side 65 of the generally conductive second element 60.

In an embodiment, the space 300 between the electrically conductive first element 50 and the electrically conductive second element 60 may have a width 301 equal to approximately fifty to sixty percent of the width 206 of the electrically conductive first element 50. As a result, the RFID tag 1 of the present device provides an optimal read range (as illustrated in the graph of FIG. 7a).

STEP 3:

Once the electrically conductive second element 60 is generated, an electrically conductive third element 70 may be created. In an embodiment, the electrically conductive third element 70 may be a conductive antenna strip. Further, in an embodiment, the electrically conductive third element 70 may be made from, for example, a metallic foil, etched metal or may be conductive printed ink The electrically conductive third element 70 may have a top 71, a bottom 72 (FIG. 6), a front 73, a back 74, a first side 75 and a second side 76. Unlike the electrically conductive first element 50 and electrically conductive second element 60, the electrically conductive third element 70 may lack any indentations on the first side 75 and may lack any indentations on the second side 76 and instead may be largely rectangular in shape aside from the curved edges as discussed below.

Preferably, the front 73 of the electrically conductive third element 70 may be approximately three-quarters the size of the front 53 of the electrically conductive first element 50. Further, preferably, the first side 75 of the electrically conductive third element 70 may be approximately one and a half times the length of the first side 55 of the electrically conductive first element 50. The electrically conductive third element 70 may be centered along a line of axis of symmetry 85 of the electrically conductive first element 50 and the electrically conductive second element 60. In particular, the axis of symmetry 85 may divide the generally conductive first element 50, the electrically conductive second element 60 and the electrically conductive third element 70 and may provide an exact mirror image with respect to those elements from the front 4 (FIG. 8) of the tag 1 to the back 5 of the tag 1. In an embodiment, the axis of symmetry 85 may be perfectly perpendicular to the imaginary divider line 200 separating the electrically conductive first element 50 and the electrically conductive second element 60. More specifically, the axis of symmetry 85 may run substantially perpendicular to the first side 55 and to the second side 56 of the electrically conductive first element 50 and substantially perpendicular to the first side 65 and the second side 66 of the electrically conductive second element 60. Further, the axis of symmetry 85 may substantially divide the electrically conductive first element 50 and electrically conductive second element 60 into two substantially equal parts.

In an embodiment, the electrically conductive third element 70 may be a reflector element. Further, in an embodiment, the electrically conductive third element 70 may be a long strip of aluminum. The aluminum may also be used in the RFID inlay or IC's 80 antenna. This may therein result in a highly directional tag 1.

The electrically conductive third element 70 is then placed on the same plane as the electrically conductive first element 50 and the electrically conductive second element 60. More specifically, the second side 76 of the electrically conductive third element 70 may be placed near but may not touch, for example, the first side 55 of the electrically conductive first element 50; opposite the side of the electrically conductive second element 60 such that the electrically conductive first element 50 separates the electrically conductive second element 60 and the electrically conductive third element 70.

A space 400 may be located between the second side 76 of the electrically conductive third element 70 and the first side 55 of the electrically conductive first element 50. The space 400 may have a width 401. In an embodiment, the width 401 of the space 400 is equal to approximately fifty to sixty percent the overall width 206 of the electrically conductive first element 50. Further, in an embodiment, the space 400 between the electrically conductive first element 50 and the electrically conductive third element 70 is substantially equal to the space 300 between the second side 56 of the generally conductive first element 50 and the first side 65 of the generally conductive second element 60. As a result, the RFID tag 1 of the present device provides an optimal read range (as illustrated in the graph of FIG. 7a).

In an embodiment, the electrically conductive third element 70 may have two larger curved portions 710 at the front 73/first side 75 corner and at the back 74/first side 75 corner and two smaller curves 711 at the front 73/second side 76 corner and at the back 74/second side 76 corner. The larger curved portions 710 may be arched-shaped forming a portion of a circle having a radius of approximately one hundred and forty to one hundred and eighty percent of the width 206 of the electrically conductive first element 50. As a result, the RFID tag 1 of the present device provides an optimal read range (as illustrated in graph of FIG. 7a).

STEP 4:
After the electrically conductive third element 70 is created, a user then may adjust the distance between the first three elements 50, 60 and 70, for optimum performance using $E_t(x) = \text{EXP}[a - x \cdot b] + E_\infty$.

$E_t(x)$=Tag's threshold energy as a function of separation.

$E_\infty$=Minimum attainable threshold energy (eg. Max read range).
x=distance between elements
a=Plot fitting parameter.
b=Plot fitting parameter.

If the constants "a" and "b" are known, then in an embodiment, once the above-identified equation is utilized, a user may then electively further alter the configuration of the device 1. More specifically, a test may be ran, for example, wherein the second side 56 of the first electrically conductive element 50 is first located approximately 0.10 inches from the first side 65 of the second electrically conductive element 60. The device 1 may then be tested for the read range. The first electrically conductive element 50 may then be moved slightly toward or away from the second electrically conductive element 60 and the read range of the device 1 tested again. This process may be repeated until an optimal read range is determined.

STEP 5:
Finally, if the electrically conductive first element 50 does not contain a RFID inlay or IC 80, then the user adds an RFID inlay or IC 80 adjacent to the electrically conductive first element 50 along the axis of symmetry 85. In an embodiment, the RFID inlay or IC 80 may be, for example, an Alien® Higgs 4 IC, an aluminum antenna or a metalized plastic base material.

At least three ways may be used to manufacture the present device 1. First, the conductive ink may be printed onto a film with adhesive. Protective layers may optionally be added with artwork. Next, the parts could be die may be cut into the desired shape from, for example, a foil or a metalized plastic. The IC may then be glued into the appropriate location via pick and place. Second, a given inlay may be ordered from a manufacture as two rolls: one with an IC and one without. The inlays would then be inserted onto a film in two steps. A conductive metal strip would already be present on this film. The second method may convert an inlay. Third, the three conductive elements may be cut out of a continuous roll of metal foil, metalized plastic, or any other electrically conductive material wherein waste material is removed. Next, an inlay may be inserted on the top of these elements. A protective film may finally be added and the parts would be die cut.

Referring again to FIG. 6, in an embodiment, the RFID tag 1 may be secured to a form factor 225. The form factor 225 may have a top 226 and a bottom 227. In an embodiment, the bottom 52 of the electrically conductive first element 50 may be secured directly to the top 226 of the form factor 225 (via an adhesive) along with the bottom 62 of the electrically conductive second element 60 and the bottom 72 of the electrically conductive third element 70. In an alternative embodiment, the top 51 of the electrically conductive first element 50 may be secured to the bottom 227 of the form factor 225 while the bottom 62 of the electrically conductive second element 60 and the bottom 72 of the electrically conductive third element 70 remain secured to the top 226 of the form factor 225 via an adhesive. Finally, in an embodiment, the device 1 may have a first electrically conductive first element 50 and a second electrically conductive first element 50 wherein the two are identical and remain directly above and below the form factor 225. As a result, the RFID tag 1 of the present device provides an optimal read range (as illustrated in the graph of FIG. 7a).

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the present application.

The invention claimed is:

1. A method of optimizing the read range of an RFID tag comprising the steps of:
   providing a first substrate for the RFID tag wherein the first substrate has a top surface and a bottom surface;
   providing an electrically conductive first element having a front, a back, a first side, a second side, a top, a bottom, and a length wherein the electrically conductive first element forms a portion of an antenna wherein the electrically conductive first element is located on the top surface of the first substrate;
   providing an electrically conductive second element having a front, a back, a first side, a second side, a top, a bottom, and a length wherein the electrically conductive second element forms a portion of an antenna wherein the electrically conductive second element is located on the top surface of the first substrate wherein the electrically conductive second element is generated by first creating a mirror image of the electrically conductive first element;
   providing an electrically conductive third element having a front, a back, a first side, a second side, a top, a bottom and a length wherein the electrically conductive third element forms a portion of an antenna wherein the electrically conductive third element is located on the top surface of the first substrate;
   altering the electrically conductive second element such that the length of the front of the electrically conductive second element is between fifty-five and sixty-five percent of the length of the front of the electrically conductive first element; and
   providing an integrated circuit or RFID inlay adjacent to or physically touching the electrically conductive first element.

2. The method of optimizing the read range of an RFID tag of claim 1 further comprising the step of:
   providing an adhesive on the bottom surface of the first substrate.

3. The method of optimizing the read range of an RFID tag of claim 1 further comprising the step of:
   providing a second substrate and a third substrate wherein the second substrate and the third substrate are on opposing sides of the first substrate and wherein the second substrate and the third substrate have each an identical electrically conductive first element, electrically conductive second element and electrically conductive third element as the first substrate and wherein the second substrate and third substrate may be removed from the first substrate.

4. The method of optimizing the read range of an RFID tag of claim 1 further comprising the step of:
   providing an indentation on the first side of the electrically conductive first element wherein the indentation is arched-shaped and wherein the indentation forms a portion of a circumference of a circle having a radius equal to approximately thirty to forty percent of the length of the electrically conductive first element.

5. The method of optimizing the read range of an RFID tag of claim 1 further comprising the step of:
   providing an indentation on the second side of the electrically conductive first element wherein the indentation is arched-shaped and wherein the indentation forms a portion of a circumference of a circle having a radius equal to approximately one hundred and fifty to one hundred and eighty percent of the length of the electrically conductive first element.

6. The method of optimizing the read range of an RFID tag of claim 4 wherein the integrated circuit or RFID inlay is located completely within the indentation of the first side of the electrically conductive first element.

7. The method of optimizing the read range of an RFID tag of claim 1 further comprising the step of:
   providing an indentation on the second side of the electrically conductive second element wherein the indentation is arched-shaped and wherein the indentation forms a portion of a circumference of a circle having a radius equal to approximately twice the width of the electrically conductive second element.

8. The method of optimizing the read range of an RFID tag of claim 1 wherein the length of the electrically conductive third element is approximately one and a half times the length of the electrically conductive first element.

9. The method of optimizing the read range of an RFID tag of claim 1 wherein the electrically conductive first element is located between the electrically conductive second element and the electrically conductive third element.

10. The method of optimizing the read range of an RFID tag of claim 5 further comprising the step of:
    providing an indentation on the first side of the electrically conductive second element wherein the indentation is arched-shaped and wherein the indentation is substantially the same size and shape as the indentation of the second side of the electrically conductive first element.

11. The method of optimizing the read range of an RFID tag of claim 1 wherein the electrically conductive third element is approximately seventy-five percent the width of the electrically conductive first element.

12. The method of optimizing the read range of an RFID tag of claim 1 further comprising the step of:
    adjusting the distance between the electrically conductive first element and the electrically conductive second element to increase read range of the RFID tag using the equation: $E_r(x)=EXP[a-x \cdot b]+E_\infty$.

13. The method of optimizing the read range of an RFID tag of claim 1 further comprising the step of:
    creating a space between the electrically conductive first element and the electrically conductive second element wherein the space has a width equal to approximately fifty to sixty percent of the width of the front of the electrically conductive first element.

14. The method of optimizing the read range of an RFID tag of claim 1 further comprising the step of:
    creating a space between the electrically conductive first element and the electrically conductive third element wherein the space has a width equal to approximately fifty to sixty percent the width of the electrically conductive first element.

* * * * *